(12) United States Patent
Kowalczyk et al.

(10) Patent No.: US 7,760,985 B2
(45) Date of Patent: Jul. 20, 2010

(54) RADIUS LIMITER AND ARRANGEMENT

(75) Inventors: Scott C. Kowalczyk, Savage, MN (US); Jonathan R. Kaml, Shakopee, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 12/381,115

(22) Filed: Mar. 6, 2009

(65) Prior Publication Data
US 2009/0175587 A1  Jul. 9, 2009

Related U.S. Application Data

(62) Division of application No. 11/714,709, filed on Mar. 5, 2007, now Pat. No. 7,509,017.

(51) Int. Cl.
*G02B 6/00* (2006.01)
(52) U.S. Cl. .................... 385/135; 385/134; 385/137
(58) Field of Classification Search ......... 385/134–137; 211/26
See application file for complete search history.

(56) References Cited

U.S. PATENT DOCUMENTS

| | | | |
|---|---|---|---|
| 2,859,843 A * | 11/1958 | Allen ..................... 52/512 |
| 5,640,482 A | 6/1997 | Barry et al. |
| 6,307,997 B1 | 10/2001 | Walters et al. |
| 6,398,149 B1 | 6/2002 | Hines et al. |
| 6,438,311 B1 | 8/2002 | Zarnowitz |
| 6,462,961 B1 * | 10/2002 | Johnson et al. ............. 361/825 |
| 6,468,112 B1 | 10/2002 | Follingstad et al. |
| 6,532,332 B2 | 3/2003 | Solheid et al. |
| 6,658,193 B1 | 12/2003 | Ati et al. |
| 7,509,017 B2 | 3/2009 | Kowalczyk et al. |
| 2003/0108322 A1 | 6/2003 | Douglas et al. |
| 2003/0119385 A1 | 6/2003 | Elliot et al. |
| 2006/0193585 A1 | 8/2006 | Hruby et al. |

OTHER PUBLICATIONS

Value-Added Module System, ADC Telecommunications, Jun. 1998.*
Value-Added Module System, ADC Telecommunications, 4 pages, (Jun. 1998).

* cited by examiner

*Primary Examiner*—Charlie Peng
(74) *Attorney, Agent, or Firm*—Merchant & Gould P.C.

(57) ABSTRACT

A cable radius limiter having a radius limiting surface that prevents damage to cables due to excessive bending. The cable radius limiter includes mounting structure and cable retaining structure arranged such that the limiter can be operably oriented and mounted to a planar mounting surface in a number of mounting orientations.

11 Claims, 7 Drawing Sheets

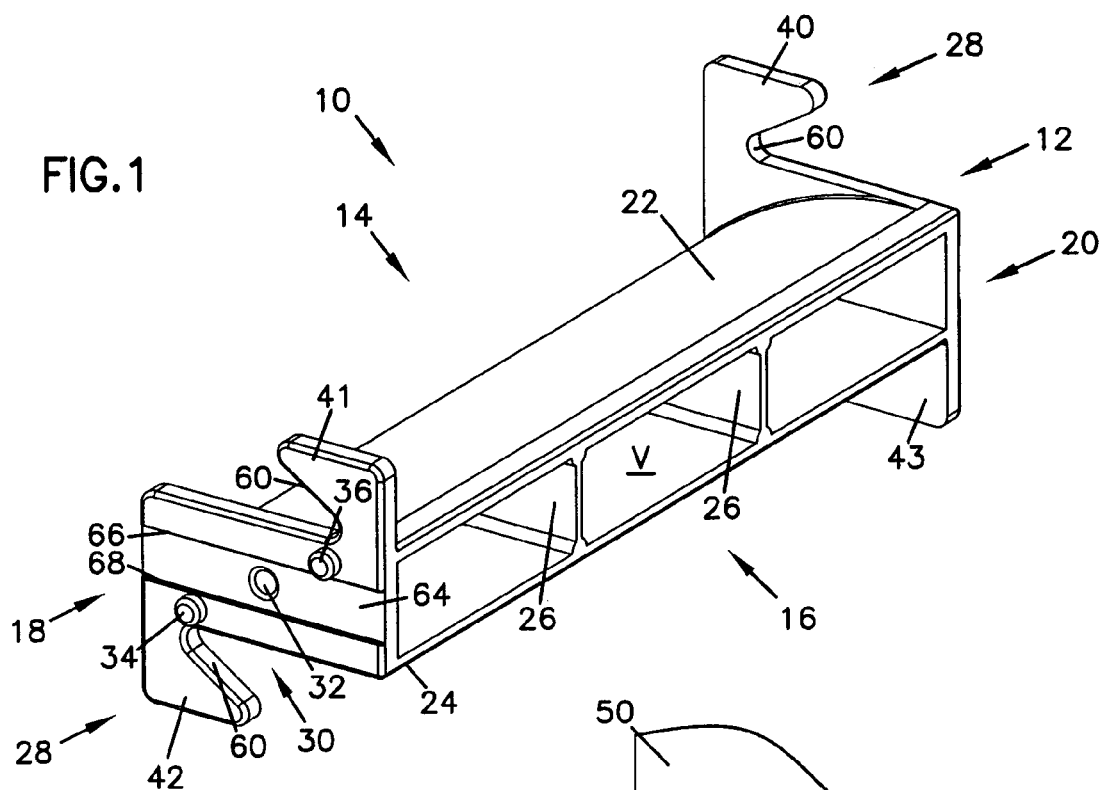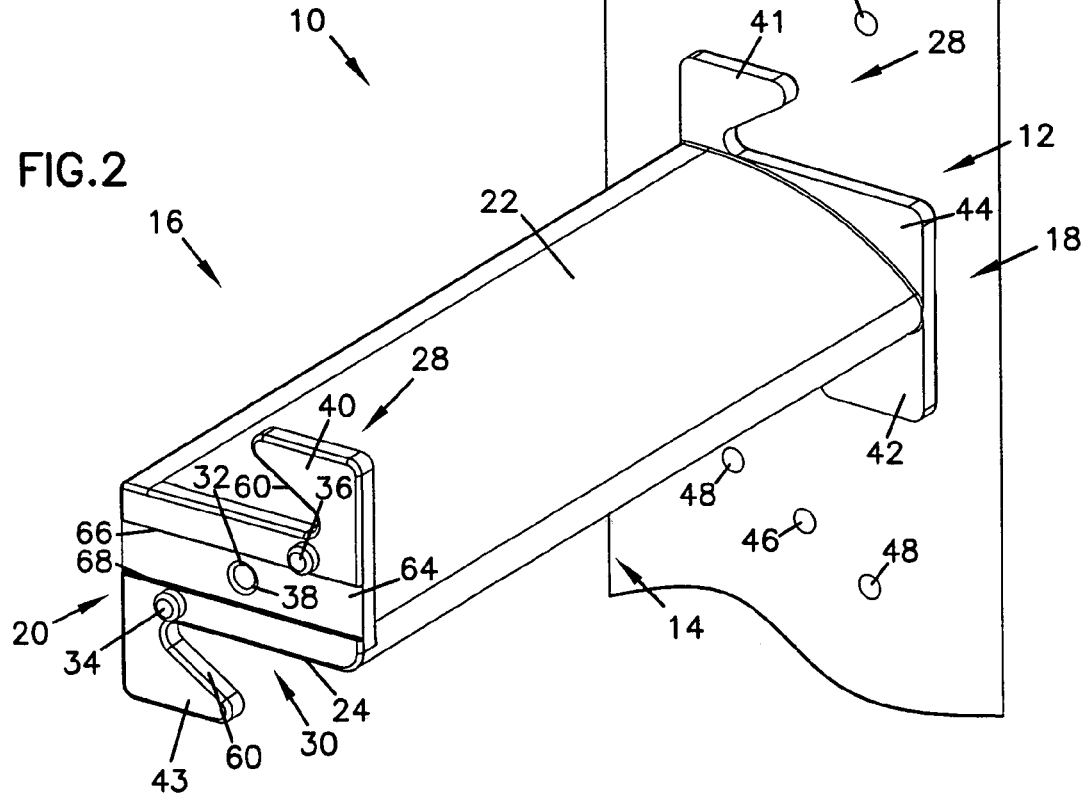

RADIUS LIMITER AND ARRANGEMENT

CROSS-REFERENCE TO RELATED APPLICATIONS

This application is a divisional application of U.S. application Ser. No. 11/714,709, filed Mar. 5, 2007 now U.S. Pat. No. 7,509,017; which application is incorporated herein by reference.

TECHNICAL FIELD

The present invention relates generally to devices and methods for use in the telecommunications industry. More particularly, the present invention relates to a radius limiter arrangement for enhancing cable management of a telecommunications system.

BACKGROUND

Telecommunications systems utilize cables (e.g., fiber optic cables or twisted pair cables) for interconnecting pieces of telecommunications equipment. Telecommunication racks typically hold a variety of different pieces of telecommunications equipment. Often thousands of cables are used to interconnect the various pieces of telecommunications equipment mounted on the racks.

Because of the large number of cables associated with telecommunications equipment, cable management is crucial. Cable management involves organizing cables so that the cables run or lie in an orderly manner. Because telecommunications systems often have different cable routing requirements, adaptability of the devices used to manage and organize cables is desirable. Cable management also involves preventing damage to the cables, such as unnecessary or excessive bending or displacement.

In general, cable management improvement has been sought, generally to efficiently and effectively manage cables by providing a device that prevents cable damage and is also adaptable to a variety of telecommunications applications.

SUMMARY

One aspect of the present invention relates to a cable radius limiter that can be used in an arrangement for routing cables. The cable radius limiter mounts to a planar mounting surface in any one of a number of mounting orientations to thereby accommodate the routing requirements of a telecommunications system.

A variety of aspects of the invention are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are exemplary and explanatory only, and are not restrictive of the claimed invention.

BRIEF DESCRIPTION OF THE DRAWINGS

FIG. 1 is a rear perspective view of one embodiment of a radius limiter, in accordance with the principles of the present disclosure;

FIG. 2 is a front perspective view of the radius limiter of FIG. 1, shown in a first mounting orientation;

FIG. 5A is a detail view of a portion of the telecommunications system structure of FIG. 5;

DETAILED DESCRIPTION

Figure 3:
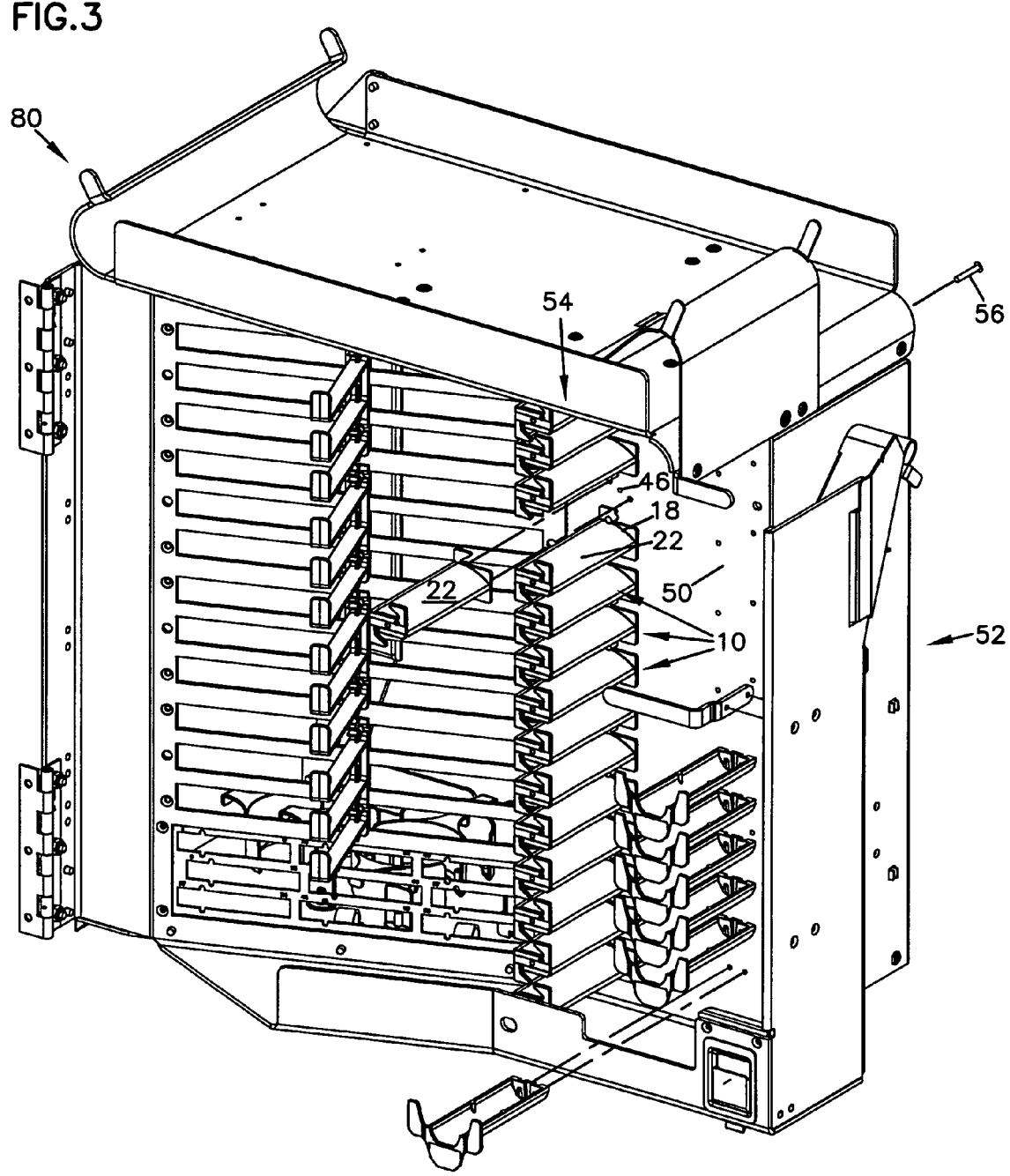
FIG. 3 is a front perspective view of a telecommunications system structure including a plurality of the radius limiters of FIG. 1, shown in a first arrangement.
Figure 4:
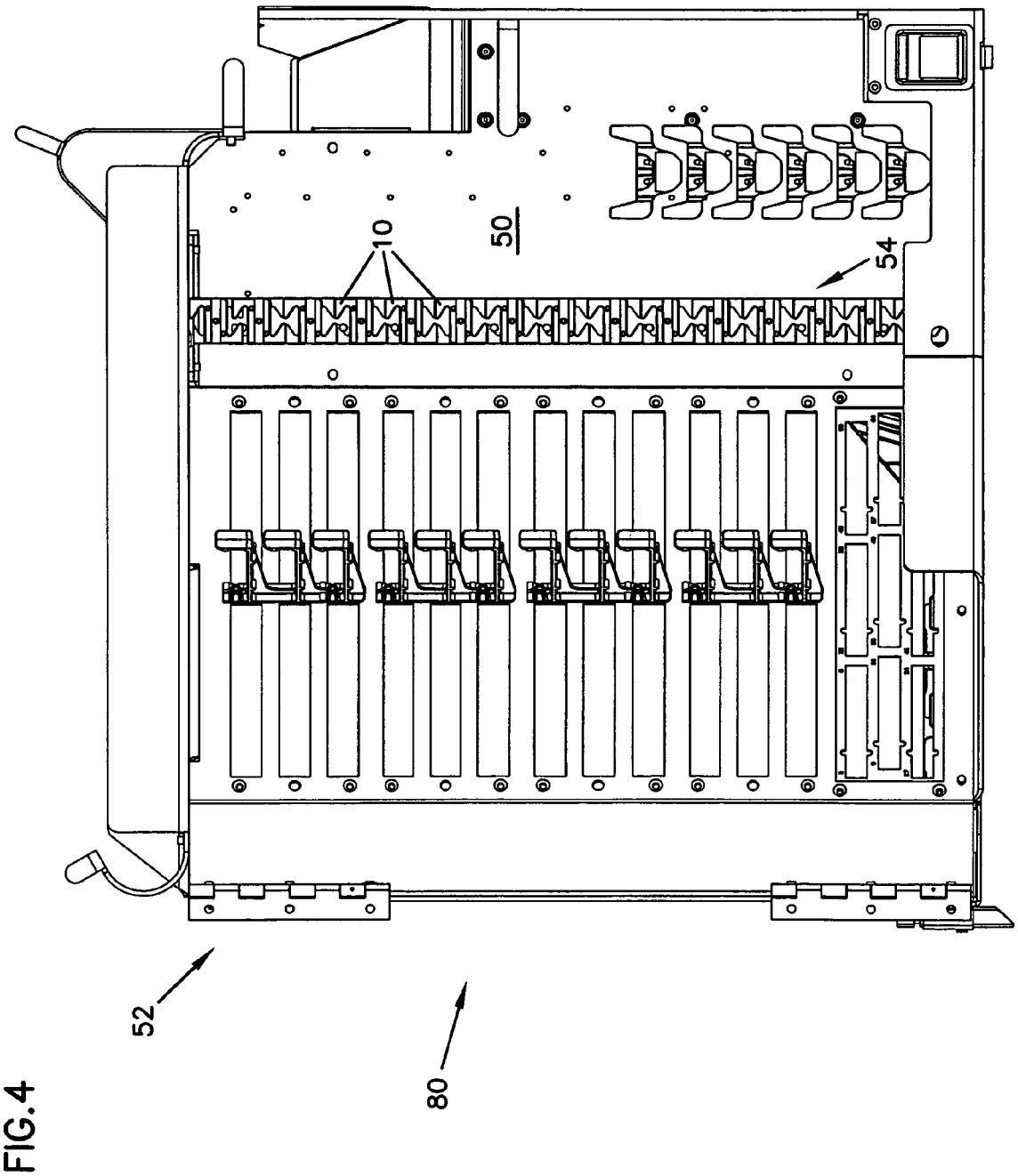
FIG. 4 is a front elevation view of the telecommunications system structure of FIG. 3.

Reference will now be made in detail to exemplary aspects of the present disclosure that are illustrated in the accompanying drawings. Wherever possible, the same reference numbers will be used throughout the drawings to refer to the same or like parts.

FIGS. 1 and 2 illustrate one embodiment of a cable management device or cable radius limiter 10 having features that are examples of how inventive aspects in accordance with the principles of the present disclosure may be practiced. The radius limiter 10 includes a radius limiting body 12 having a front 14 positioned opposite from a rear 16, and a first end 18 positioned opposite from a second end 20. A first surface 22 and a second opposite surface 24 extend between the front 14 and the rear 16, and between the first and second ends 18, 20 of the radius limiting body 12.

Preferably, at least one of the first and second surfaces 22, 24 is a radius limiting surface configured to limit bending of cables extending or running along the surface. In the illustrated embodiment, the first surface 22 is a radius limiting surface. That is, the first surface 22 is a curved surface having a convex curvature that limits or minimizes the bend radius of cable to prevent damage. In the illustrated embodiment, the convex curvature provides at least a 1.5 inch radius bend protection for cables extending along the curved surface 22.

The second opposite surface 24 of the radius limiting body 12 is a generally flat or planar surface. Each of the first and second surfaces 22, 24 converge at the front 14 of the radius limiting body 12. At the rear 16 of the radius limiting body 12, the surfaces 22, 24 are spaced apart from one another. A volume V is defined between the first and second surfaces 22, 24 (FIG. 1). Gussets 26 can be provided within the volume V to support the spaced configuration of the first and second surfaces 22, 24.

Preferably, the cable radius limiter 10 is molded from a plastic material as a single unitary construction. In other embodiments, the cable radius limiter 10 can be constructed from other material, such as metal, and/or be an assembly of components having features herein described.

Referring now to FIGS. 1-3, the cable radius limiter 10 includes a mounting arrangement 30 used to secure the radius limiter 10 to a mounting surface 50 (FIG. 3) of a telecommunications system structure 52. In FIG. 3, a telecommunications system 80 is illustrated. The telecommunications system structure 52 of the system 80 can include, for example, a panel, telecommunication rack, cabinet, equipment structure, or other framework or system component. The present cable radius limiter 10 is designed to mount to a flat panel or planar surface (e.g. 50) of a telecommunications system structure 52. The present cable radius limiter thereby eliminates the need for custom brackets or mounting structure, and in turn reduces the spatial requirement for cable management.

Referring back to FIGS. 1 and 2, the mounting arrangement 30 of the present cable radius limiter 10 generally includes a fastener mount 32 located at each of the first end 18 and the second end 20 of the radius limiter. The mounting arrangement 30 also includes first and second locating elements 34, 36 provided at each of the first end 18 and the second end 20 of the radius limiter.

The fastener mount 32 at each end 18, 20 is configured to receive a fastener 56 (FIG. 3). In the illustrated embodiment, the fastener mount 32 defines a fastener-receiving aperture or bore 38 (FIG. 2) that can be used with thread-forming fasteners. Other types of fasteners, such as rivets or pin-type fasteners can be used. In the alternative, the bore 38 can include internal threads for use with standard threaded fasteners. Still other types of mounting structures, such as snap mounts or tab mounts can also be used. In the illustrated embodiment, the fastener mount 32 includes only a single bore 38 that is centrally located between the first and second locating elements 34, 36 of the mounting arrangement 30.

Referring still to FIGS. 1 and 2, the present cable radius limiter 10 includes cable retaining structure 28 located at the ends 18, 20 of the radius limiting body 12. The cable retaining structure 28 is configured and arranged to retain cables between the ends 18, 20 of the radius limiting body 12. In the illustrated embodiment, the cable retaining structure 28 includes cable retaining tabs 40-43. The cable retaining structure 28 further includes a corner portion 44 (FIG. 2) of the second end 20 of the radius limiting body 12.

In use, the cable retaining tabs 40-43 and the corner portion 44 of the cable retaining structure 28 are designed to prevent the cables from inadvertently falling off the curved surface 22 of the cable radius limiter 10 when the cables experience vibrations or movement, for example. The cable retaining tabs 40-43 extend in a perpendicular direction away or outward from the first and second surfaces 22, 24 of the radius limiting body 12. In the illustrated embodiment, the cable retaining tabs 40-43 include forward tabs 40, 42 and rearward tabs 41, 43. The forward tabs 40, 42 are located toward the front 14 of the radius limiting body 12, and the rearward tabs 41, 43 are located toward the rear 16 of the radius limiting body 12. The cable retaining structure 28 can further be described as including a pair of tabs, one forward and one rearward (i.e., tabs 42-43 and tabs 40-41), located adjacent to each of the first and second surfaces 22, 24 of the radius limiting body 12. In the alternative, the cable retaining structure 28 can generally be described as including a pair of tabs, one forward and one rearward (i.e., tabs 40-43 and tabs 41-42) at each of the ends 18, 20 of the radius limiting body 12.

In general, the radius limiter 10 of the present disclosure is constructed for use in managing cables of telecommunications systems. The system 80 shown in FIG. 3 illustrates one embodiment of a radius limiter arrangement 54 that utilizes a plurality of the radius limiters 10.

Referring to FIG. 3, the plurality of cable radius limiters 10 of the radius limiter arrangement 54 are secured to the planar mounting surface 50 of the telecommunications system structure 52. It is to be understood that the planar mounting surface 50 to which the radius limiter arrangement 54 is designed to mount can be a designated cable management panel or simply the planar surface of a rack, equipment structure, or cabinet (e.g., an interior or exterior wall).

Figure 5:
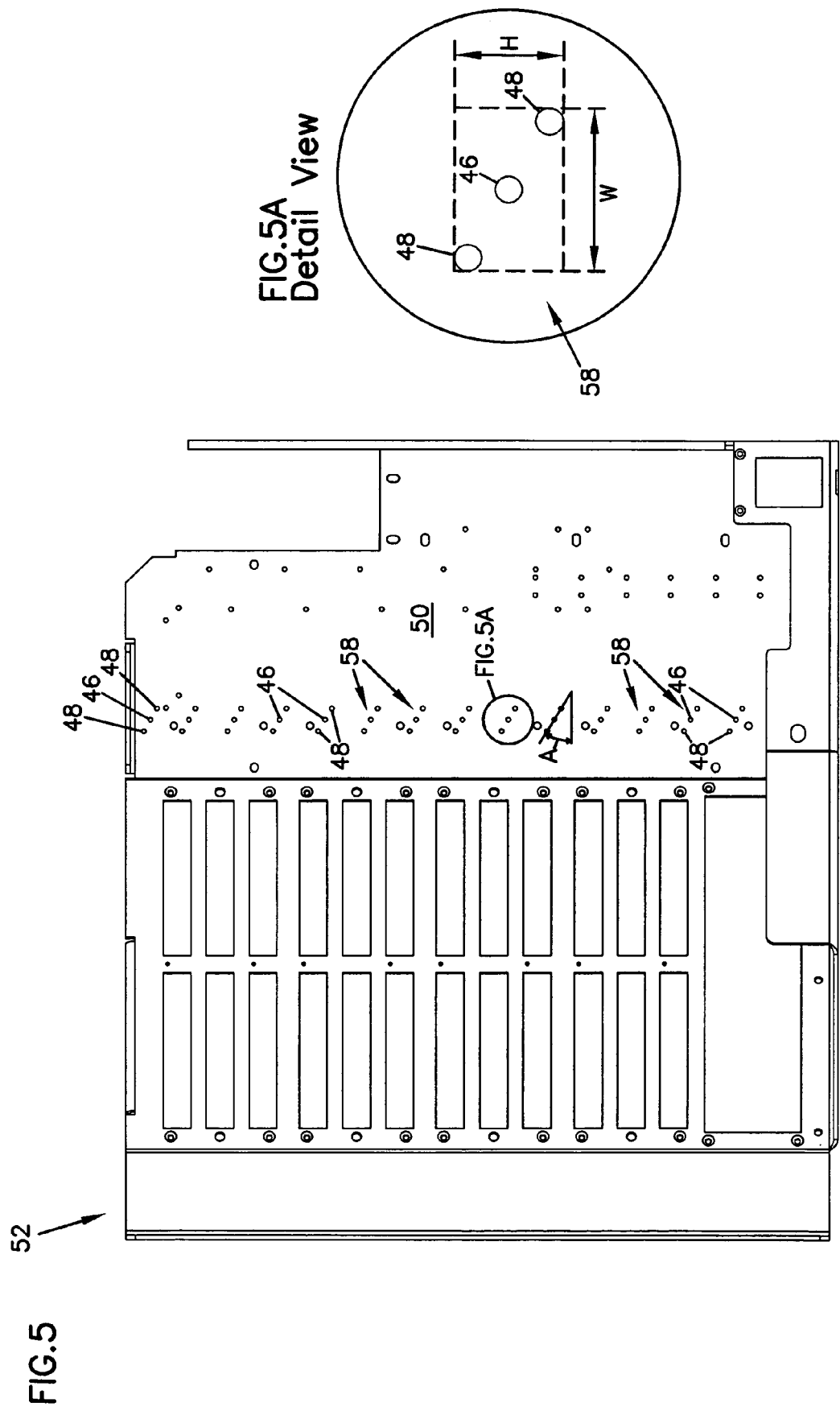
FIG. 5 is a front elevation view of the telecommunications system structure of FIG. 4, shown without the plurality of radius limiters.

Referring to FIG. 5, the planar mounting surface 50 of the telecommunications system structure 52 includes fastener-receiving openings or through holes 46 (e.g., notches, slots, slotted holes, or other apertures) formed in the planar surface 50. Fasteners (e.g., 56; FIG. 3) are inserted through the holes 46 from the back side of the mounting surface 50 to engage the bore 38 at one end 18, 20 of the radius limiter 10 placed at the front side of the mounting surface 50. In one embodiment, each of the through holes 46 is between about 1/16 and 3/8 inch in diameter; in the illustrated embodiment, each through hole is about 1/8 inch in diameter.

The planar mounting surface 50 of the telecommunications system structure 52 also includes locating structure 48 (e.g., locating apertures or holes) that maintains the radius limiter 10 in a selected mounting orientation. The locating elements 34, 36 (FIG. 2) of the radius limiter 10 are sized to fit within the locating apertures 48 of the planar mounting surface 50 and prevent rotation of the radius limiter relative to the planar mounting surface. In one embodiment, the locating apertures 48 are between about 1/16 and 3/8 inch in diameter; in the illustrated embodiment, the locating apertures are about 1/8 inch in diameter.

The present radius limiter is designed for easy installation and requires only a single fastener to secure the limiter to the planar mounting surface. Rotation of the radius limiter about the single fastener is prevented by engagement between the locating elements 34, 36 of the radius limiter 10 and the locating apertures 48 of the planar mounting surface 50.

In the illustrated embodiment, the locating elements 34, 36 are pins (e.g., pegs, bosses, or projections) that are diagonally offset from the bore 38. Correspondingly, the locating apertures 48 (FIG. 2) and the fastener-receiving opening 46 are diagonally arranged. In particular, the one of the locating apertures 48 is located above the fastener-receiving opening 46 and the other locating aperture is located below the fastener-receiving opening. It is contemplated that in the alternative, apertures can be formed in the radius limiter 10 and projections can be formed on the mounting surface 50.

Referring again to FIG. 5, the diagonally offset locating apertures 48 and the fastener-receiving opening 46 define a hole pattern 58. Each hole pattern 58 includes only the three holes, in particular, the two locating apertures 48 and the fastener-receiving opening 46. The three holes of the hole pattern 58 are diagonally aligned at a 30-degree angle A relative to horizontal.

Referring to FIG. 5A, a detail view of a single hole pattern 58 is illustrated. The hole pattern 58 has an overall height H that is defined between upper and lower tangential boundaries (shown in dashed lines) of the locating apertures 48. In one embodiment, the height H is between about 0.25 and 1.0 inches; in the illustrated embodiment, the height H is about 0.5 inches. The hole pattern 58 also has an overall width W that is defined between outer tangential boundaries (shown in dashed lines) of the locating apertures 48. In one embodiment, the width W between about 0.5 and 1.25 inches; in the illustrated embodiment, the width W is about 0.75 inches. Only the three holes of the hole pattern 58 exist between the overall height H and the overall width W of the hole pattern. That is, the mounting surface 50 is solid or free of other apertures within the upper and lower tangential boundaries and the outer tangential boundaries.

The planar mounting surface 50 shown includes only a single column of hole patterns 58. In other words, the mounting surface 50 includes a number of rows of hole patterns, each row including only a single hole pattern 58. Other arrangements of hole patterns are contemplated, depending upon the required functionality and spatial constraints of the telecommunications system structure 52 defining the mounting surface 50.

Each of the radius limiters 10 is designed so that the radius limiter can be oriented in a number of mounting orientations when mounted to the mounting surface 50. In particular, the mounting arrangement 30 (i.e., the bore 38 and the locating elements 34, 36) and the cable retaining structure 28 are arranged such that the cable radius limiter can be mounted to the planar mounting surface 50 in any one of four mounting orientations. This feature allows a technician to adapt or configure the radius limiter arrangement 54 to fit the particular cable routing requirements of the system.

Figure 6:
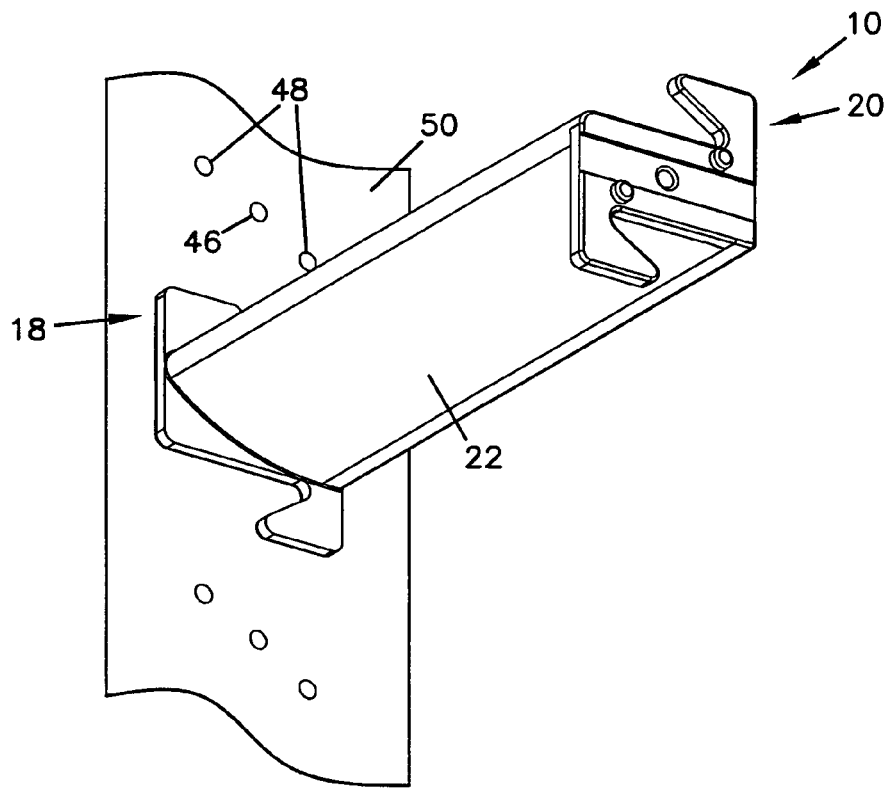
FIG. 6 is a front, bottom perspective view of the radius limiter of FIG. 1, shown in a second mounting orientation.
Figure 7:
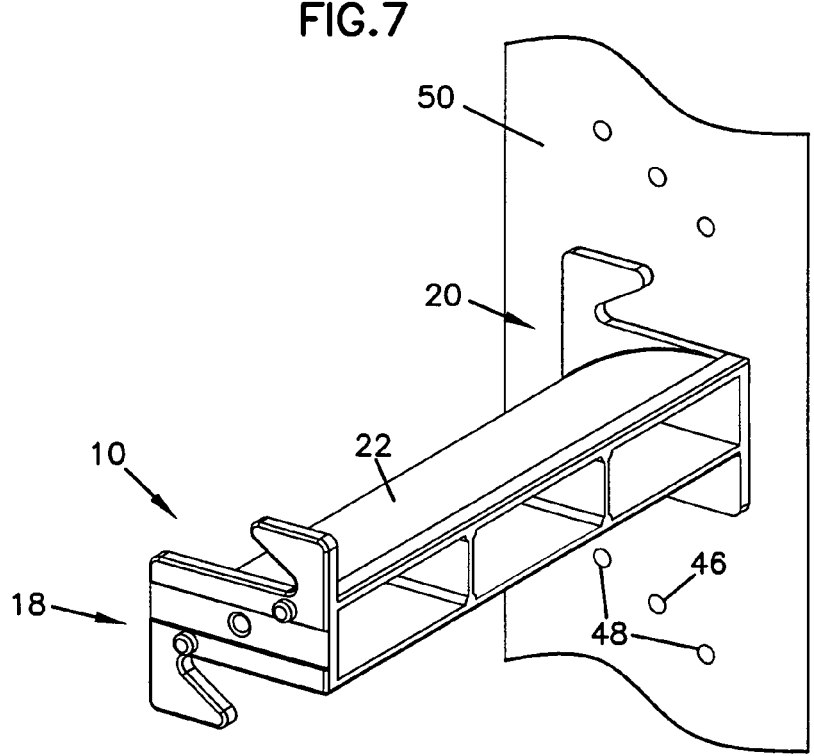
FIG. 7 is a rear, top perspective view of the radius limiter of FIG. 1, shown in a third mounting orientation.
Figure 8:
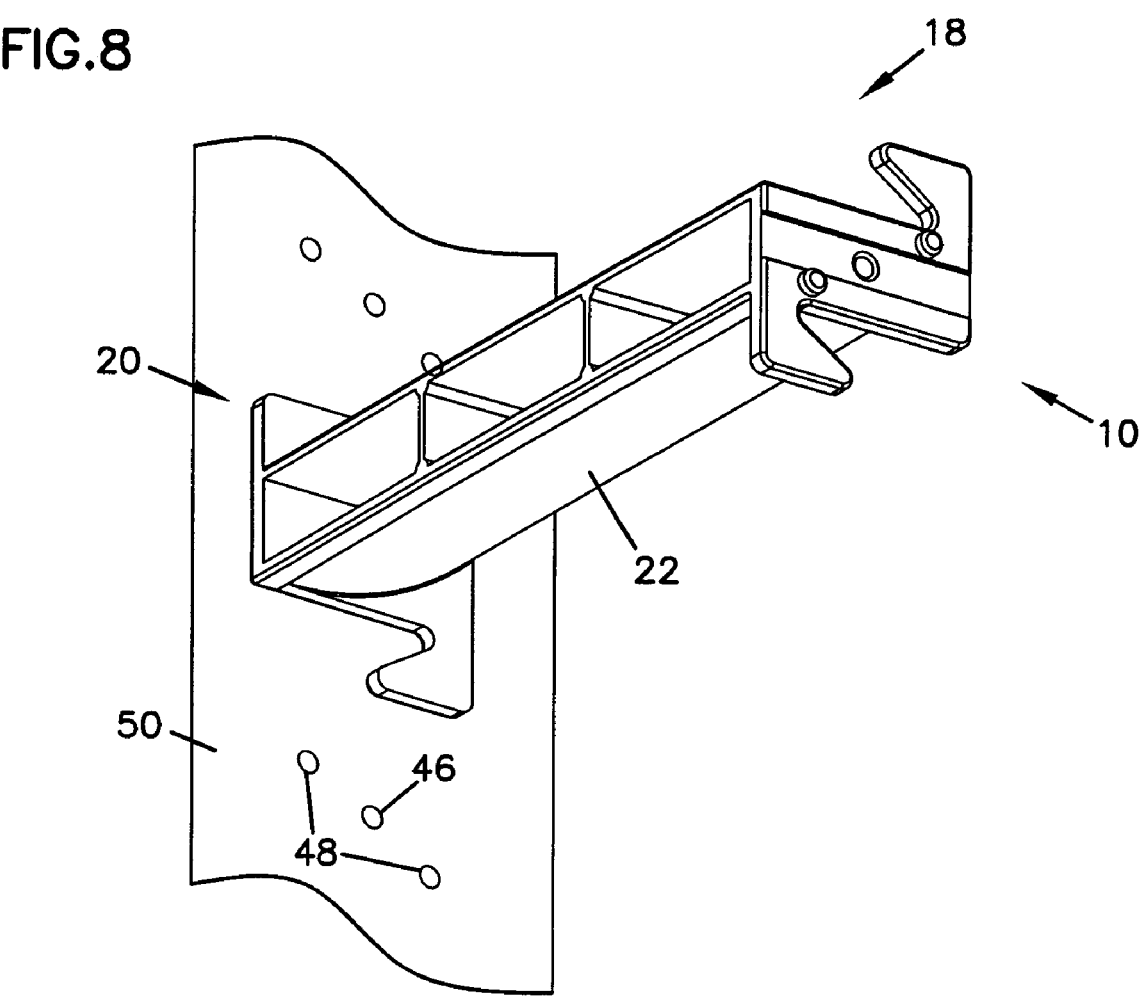
FIG. 8 is a rear, bottom perspective view of the radius limiter of FIG. 1, shown in a fourth mounting orientation.

In the first orientation, as shown in FIGS. 2 and 3 (the mounting surface 50 shown schematically in FIG. 2), the first end 18 of the radius limiter is mounted flush to the mounting surface 50 such that the first curved surface 22 of the radius limiter 10 curves downward to the right to accommodate a correspondingly routed cable. In the second orientation, as shown in FIG. 6, the first end 18 of the radius limiter is mounted flush to the mounting surface 50 such that the first curved surface 22 of the radius limiter 10 curves upward to the left to accommodate a correspondingly routed cable. In the third orientation, as shown in FIG. 7, the second end 20 of the radius limiter is mounted flush to the mounting surface 50 such that the first curved surface 22 of the radius limiter 10 curves downward to the left to accommodate a correspondingly routed cable. And, in the fourth orientation, as shown in FIG. 8, the second end 20 of the radius limiter is mounted flush to the mounting surface 50 such that the first curved surface 22 of the radius limiter 10 curves upward to the right to accommodate a correspondingly routed cable.

When mounting the cable radius limiter 10 to the telecommunications system structure 52, the technician determines the desire mounting orientation, and then accordingly inserts the locating elements 34, 36 of the cable radius limiter 10 into the locating apertures 48 of the mounting surface 50. A fastener (e.g. 56, FIG. 3) is then inserted through the fastener-receiving opening 46 to engage the bore 38 of the radius limiter 10. When the radius limiter is secured to the telecommunications system structure 52 in this matter, the locating elements 34, 36, and the locating apertures 48 of the mounting arrangement 30 prevent rotation of the cable radius limiter 10 relative to the mounting surface 50.

The arrangement of the mounting arrangement 30 and the cable retaining structure 28 of the cable radius limiter 10 both provide a reversible or universal feature. That is, both the mounting arrangement 30 and the cable retaining structure 28 are configured and arranged so that the cable radius limiter 10 can be operably oriented and mounted relative to the telecommunications system structure 52 in any one of the four mounting orientations. What is meant by operably oriented is that the cable radius limiter 10 functions as intended to retain cables and limit the bend radius of cables to prevent cable damage. In particular, when operably oriented, cables 70 (FIG. 8) can be routed and retained along the curved surface 22 of the cable radius limiter 12 so that the cables run upward or downward, depending upon the selected orientation, and while being protected from excessive bending. This adaptable mounting feature of the present radius limiter reduces costs associated with manufacturing in that a single cable radius limiter 10 can be produced for use in any one of the mounting orientations.

In general, the radius limiter arrangement 54 can include a number of cable radius limiters 10 mounted in different orientations to accommodate the specific requirements of a particular telecommunications system. In the illustrated embodiment of FIG. 9, the arrangement 54 includes some radius limiters 10a oriented in the first mounting orientation (shown in FIG. 2) and some radius limiters 10d oriented in the fourth mounting orientation (shown in FIG. 8). It is also contemplated that in some arrangements 54, all the cable radius limiters 10 can be mounted in only one of the particular mounting orientations, as shown in FIG. 3; and in other arrangements, some cable radius limiters 10 may be oriented toward the right (as shown in FIGS. 2 and 8) while others are oriented toward the left (as shown in FIGS. 6 and 7). As can be understood, a variety of radius limiter arrangements can be provided with the universal radius limiter 10 of the present disclosure.

Figure 9:
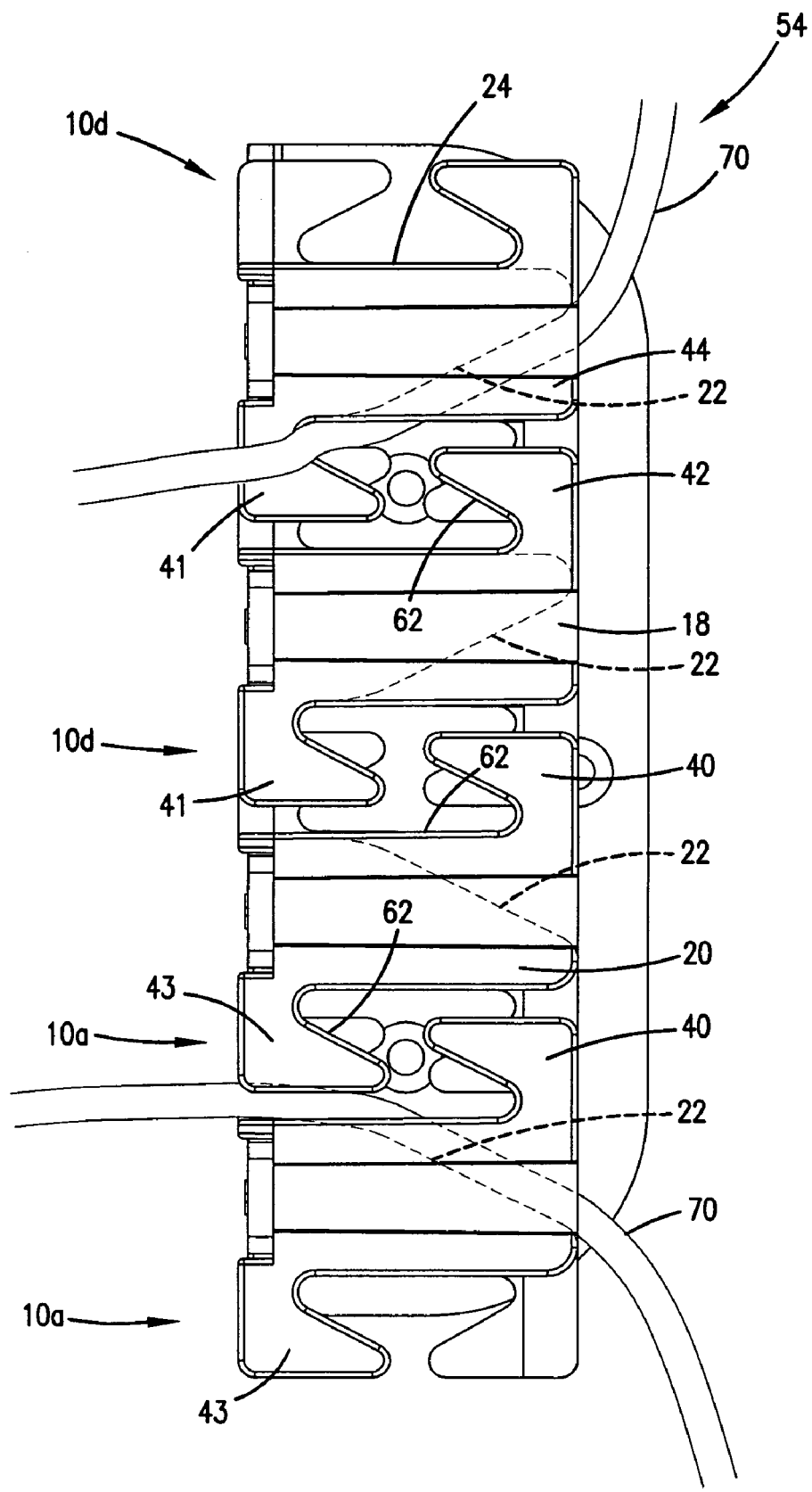
FIG. 9 is a front elevation view of a plurality of radius limiters of FIG. 1, shown in a second arrangement.

Referring back to FIGS. 1 and 2, the forward and rearward tabs 40-43 located at the ends 18, 20 of the radius limiting body 12 have a cutout region 60. The cutout regions 60 define access channels 62 (FIG. 9) when the cable radius limiters 10 are stacked relative to one another. As shown in FIG. 9, the access channels 62 formed are a Z-shaped channel. The Z-shaped channels 62 allow cables 70 to be passed through the tabs 40-43 and onto the curved surfaces 22 while still retaining the cables 70 between the ends 18, 20 of the cable radius limiters 10. That is, and with reference to the top two radius limiters 10d of FIG. 9, the rearward tab (e.g., 41) and the forward tab (e.g., 42) of two adjacent cable radius limiters 10, in addition to the corner portion 44 of one of the limiters 10, cooperate to provide a window (i.e., the access channel 62) through which cables 70 can be routed. Yet, while functioning as a cable entry and/or exit, the configuration of the window or access channel 62, i.e., the configuration of the tabs 41-43, however, still prevents the cables from inadvertently falling off the cable radius limiter 10 when the cables 70 or arrangement 54 experience vibrations or movement, for example.

Referring again to FIGS. 1 and 2, each of the cable radius limiters 10 can include a region for placement of indicia or labels for the purpose of identifying the cables 70 carried within the particular arrangement. In the illustrated embodiment, the ends 18, 20 of the cable radius limiters 10 include a shallow channel or recessed area 64 for placement of indicia or labels. Edges 66, 68 of the recessed area 64 can be used to align labels that adhere to the ends 18, 20 of the radius limiters 10.

The present radius limiter 10 is generally configured to mount to a planar surface with a single fastener. The single fastener attachment feature reduces assembly and installation time. The planar surface mounting arrangement eliminates the need for custom mounting brackets and reduces spatial requirements for cable management. The above specification provides a complete description of the cable management device, assembly, system, and method. Since many embodiments of the invention can be made without departing from the spirit and scope of the invention, the invention resides in the claims hereinafter appended.

What is claimed is:

1. A cable management arrangement for managing cables, the cable management arrangement comprising:
   a) a mounting arrangement including:
      i) a planar surface defining a plurality of hole patterns, each one of the hole patterns including only three holes, the three holes including:
         1) a first through hole sized for receiving a fastener;
         2) a second locating aperture located diagonally above the through hole; and
         3) a third locating aperture located diagonally below the through hole;

ii) wherein the three holes of each hole pattern are diagonally aligned, and wherein each hole pattern has an overall height and an overall width defined between the second and third locating apertures, only the three holes of the hole pattern existing between the overall height and the overall width of the hole pattern; and b) a cable management device having a radius limiting surface and mounting structure that mounts the device to one of the hole patterns of the plurality of hole patterns.

2. The cable management arrangement of claim 1, wherein the planar surface includes only a single column of hole patterns.

3. The cable management arrangement of claim 1, wherein the planar surface includes a number of rows of hole patterns, each row having only one hole pattern.

4. The cable management arrangement of claim 1, wherein the three holes of each hole pattern are diagonally aligned at a 30-degree angle relative to horizontal.

5. The cable management arrangement of claim 1, wherein the through hole has a first diameter, and each of the locating apertures has a second diameter, the first and second diameters of the through hole and the locating apertures being about 1/8 inch.

6. The cable management arrangement of claim 1, wherein the overall height of the hole pattern is about 0.5 inches and the overall width of the hole pattern is about 0.75 inches.

7. A cable management arrangement for managing cables, the arrangement comprising:
  a) a mounting arrangement including:
    i) a planar surface defining a column of hole patterns, each one of the hole patterns including only three diagonally-aligned holes, the three holes including:
      1) a first through hole sized for receiving a fastener;
      2) a second locating aperture located diagonally above the through hole; and
      3) a third locating aperture located diagonally below the through hole;
    ii) wherein the first through holes of the hole patterns are vertically aligned within the column of hole patterns, the second locating apertures of the hole patterns are vertically aligned within the column of hole patterns, and the third locating apertures of the hole patterns are vertically aligned within the column of hole patterns;
    iii) wherein each hole pattern has an overall height and an overall width defined between the second and third locating apertures, only the three holes of the hole pattern existing between the overall height and the overall width of the hole pattern; and
  b) a cable management device having a radius limiting surface and mounting structure that mounts the device to one of the hole patterns of the plurality of hole patterns.

8. The cable management arrangement of claim 7, wherein the planar surface includes only a single column of hole patterns.

9. The cable management arrangement of claim 7, wherein the three holes of each hole pattern are diagonally aligned at a 30-degree angle relative to horizontal.

10. The cable management arrangement of claim 7, wherein the through hole has a first diameter, and each of the locating apertures has a second diameter, the first and second diameters of the through hole and the locating apertures being about 1/8 inch.

11. The cable management arrangement of claim 7, wherein the overall height of the hole pattern is about 0.5 inches and the overall width of the hole pattern is about 0.75 inches.

* * * * *